Patented Oct. 31, 1933

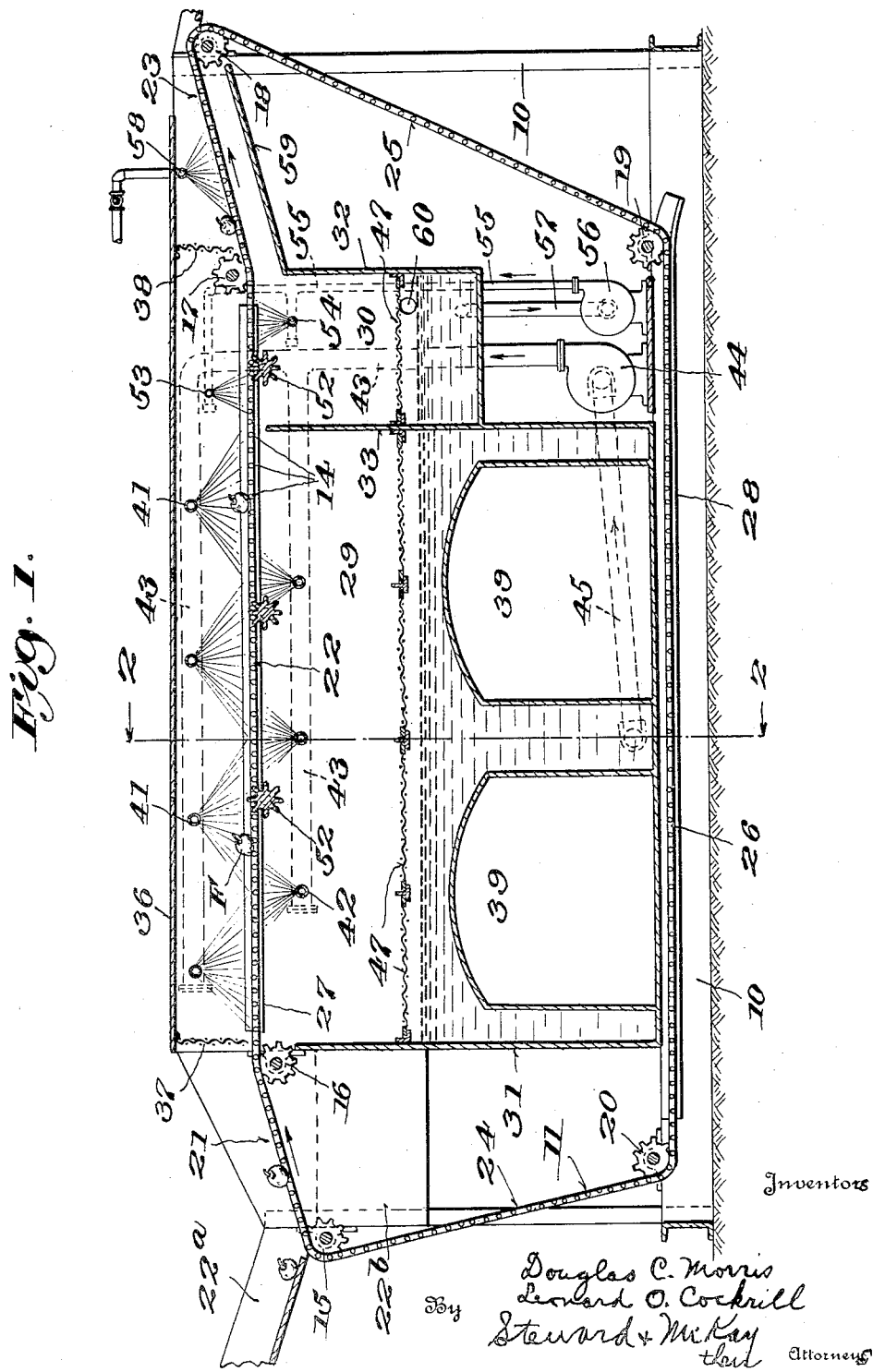

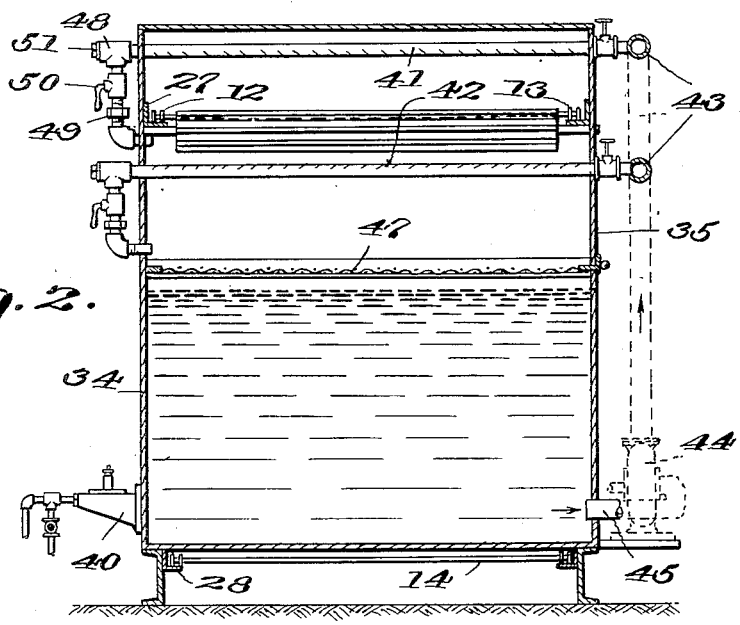
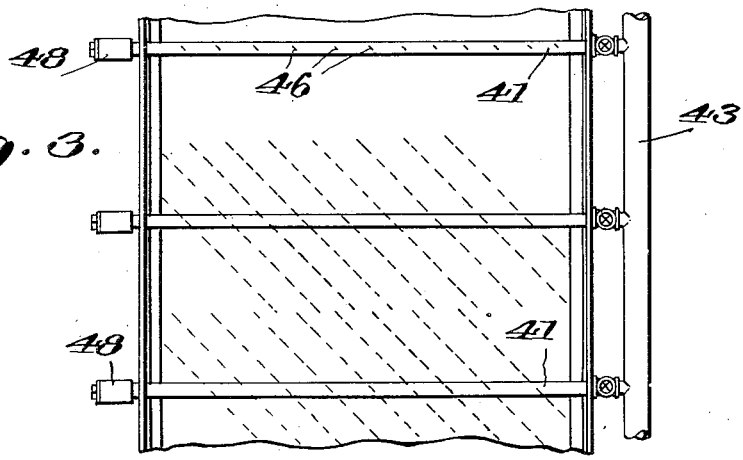

1,932,827

UNITED STATES PATENT OFFICE 1,932,827

APPARATUS FOR PREPARING FRESH FRUIT FOR MARKET

Douglas C. Morris and Leonard O. Cockrill, Yakima, Wash., assignors to Brogdex Company, Winter Haven, Fla., a corporation of Florida Application June 25, 1928. Serial No. 288,158

3 Claims. (Cl. 146—194)

This invention relates generally to apparatus for preparing fresh fruit for market; and it relates more particularly to apparatus for cleansing fruit to remove undesirable foreign matter adhering thereto, the term "fruit" as used herein being used in a broad sense to include not only fruit proper, but also vegetable and similar foodstuffs.

Fruit as it comes from the grove or orchard is usually covered with some sort of foreign matter which should be removed in the course of preparing or packing the fruit for market. In packing fruit on a commercial basis, it must be handled quickly and in large quantities in order to keep packing costs down; on the other hand, it should be handled carefully in order to avoid injuries which lead to decay and as fruit is by nature tender and easily injured the problem of commercially packing fruit without unduly injuring it is a big one.

While the cleansing, on a commercial scale, of fruit in general to remove adherent foreign matter without causing undue injury to the fruit is in itself a serious problem, the cleansing of apples and other fresh fruit whose skin or rind carries poisonous spray residues deposited there as a result of orchard or grove spraying to protect the fruit from insect pests during its development on the tree is an especially serious problem.

In combating insect pests which attack and damage apples, pears and other fresh fruit while growing on the tree, it is customary to spray the fruit with highly toxic insecticides and these insecticides, such as lead arsenate and the like, are frequently employed in the form of suspensions or emulsions with water, oil of various kinds, and so called "spreaders" and in some cases an oil spray is used after the insecticide spray to keep the latter from being washed off by rain.

The danger to the public in eating sprayed fruit such as apples which are frequently eaten without removing the skin carrying the highly toxic spray residue has long been recognized and in fact official regulation fixing maximum tolerances of toxic spray residue have long been in force.

It is therefore essential, in preparing such fruit for market, that the poisonous spray residues be removed, but, because of the oils and spreaders used in mixture or in conjunction with the insecticide and because of the oily and waxy nature of the skin, the toxic residue sticks very tenaciously and until recently attempts to remove it have not been satisfactory. Mechanical or manual wiping of the fruit to remove the spray residue has been tried with unsuccessful results.

A principal object of the present invention is to provide apparatus for removing foreign matter from fruit in general and more particularly for removing poisonous spray residues from apples, pears and the like which will not only be effective to remove the spray residues to the necessary or desired extent but which will do so without undue injury to the fruit.

Another object of the invention is to provide apparatus of the character described which is simple and which may be initially installed and operated at low cost.

Other objects and advantages of the invention will be apparent from the following description taken in connection with the accompanying drawings which illustrate one practical form of apparatus embodying the invention, it being understood that the description of this particular embodiment is merely descriptive and not restrictive.

Referring to the drawings:

Fig. 1 is a side elevation in longitudinal section of apparatus embodying the invention;

Fig. 2 is a sectional view taken on the line 2—2 of Fig. 1 looking in the direction of the arrows; and Fig. 3 is a fragmentary top plan view showing a section of the apparatus with the cover plates removed.

Generally described, the invention comprises means for spraying the fruit with a cleansing liquid in such a way that the entire surface of the fruit, irrespective of how irregular it may be, is reached by the spray, to the end that the undesirable foreign matter carried by the fruit may be removed. In some cases this spray liquid may be plain water, but in using the apparatus for the removal of poisonous spray residues from fruit, it is desirable to use a liquid comprising a water solution containing a reagent having, under the conditions of application, a solvent, saponifying, emulsifying or similar action on the spray residue, which, because of its oily and/or waxy nature, is repellent to aqueous contact.

For convenience, the apparatus will be described as used for treating apples or the like with a liquid of the above character to remove poisonous spray residues, but it is to be understood that the apparatus is not limited to this particular use.

Referring to the drawings, 10 indicates a framework on which is mounted an endless conveyor 11 for supporting the fruit F to be treated. In the example illustrated, conveyor 11 comprises two endless sprocket chains 12 and 13 between which are secured conveyor rods or slats 14, the conveyor being supported or guided by sprocket wheels 15, 16, 17, 18, 19 and 20 in such a way as to provide upper and lower flights. The upper flight comprises inclined receiving section 21, a substantially horizontal section or portion 22 and an inclined discharge portion 23. The lower flight of the conveyor comprises inclined portions 24 and 25 and a substantially horizontal portion 26. The horizontal portions or sections 22 and 26 of the endless conveyor 11 are supported on upper and lower tracks or guideways 27 and 28, respectively, the sprocket chains 12 and 13 sliding along these tracks or runways which, in a typical instance, may be made of angle irons secured to the framework 10.

The fruit to be treated, which may be assumed to be apples, is fed to the receiving end or portion 21 of the conveyor 11 by a chute or delivery board indicated at 22ª. As the fruit travels along on the inclined portion 21, the dust or dirt, leaves and other foreign matter which may accompany the fruit as it comes from the grove or orchard falls between the conveyor rods 14 into a chute or hopper 22ᵇ.

As the conveyor advances in the direction of the arrows shown in Fig. 1, the fruit passes over tanks or receptacles 29 and 30 mounted between the horizontal portions 22 and 26 of the upper and lower flights of the conveyor. The end walls 31 and 32 and the division wall 33 of tanks 29 and 30 extend up so that they just clear the underside of the horizontal portion 22 of the upper flight of the conveyor and the side walls 34 and 35 of the tanks extend up above the conveyor a sufficient distance to provide a housing which supports removable cover plates 36. The ends of this housing or casing are preferably closed by flexible flaps 37 and 38 made of canvas or the like. Tank 29, which is somewhat larger than tank 30, contains the treating solution which is to be sprayed on the fruit as it is carried along on the conveyor 11. Any suitable treating solution may be used within the broad scope of the invention but in practice a solution containing caustic soda, soda ash and borax with or without a small amount of soap has been found to give excellent results. It is desirable to apply this solution warm and furnaces 39 heated by burners 40 are provided for heating the solution.

The solution from tank 29 is applied to the fruit carried by conveyor 11 by a plurality of upper and lower spray devices or pipes 41 and 42 located above and below a portion of the horizontal upper run or flight 22 of the conveyor, spray pipes 41 projecting the treating solution downwardly on the fruit from above the conveyor and spray pipes 42 projecting the treating solution upwardly against the fruit from below. Spray devices 41 and 42 comprise substantially horizontally arranged pipes which extend across or transversely of a portion of the upper horizontal flight 22 of the conveyor and across the top of tank 29, being supported by the side walls 34 and 35 thereof just under the cover plates 36. One end of each of the spray pipes 42 is connected to a pipe line 43 which is connected to the discharge or pressure side of a pump 44, the suction or intake of which is connected by a pipe 45 to the bottom of tank 29 whereby treating solution under pressure is supplied to the spray devices. Each of these spray devices or pipes 41 and 42 is provided with a plurality of substantially parallel spray openings or slots 46 arranged at an angle to the axis of the spray pipe and at an angle to the direction of travel of the conveyor. These spray devices thus provide means for projecting substantially parallel sheets of diffused spray on the fruit at an angle to its line of travel and the upper spray devices are arranged so that the spray from one spray device meets or overlaps the spray from an adjoining spray device, thus providing a continuous shower of spray for the fruit during the entire time it is passing between these spray devices. By this arrangement the spray devices operate at maximum efficiency and all the surfaces of the fruit are effectively sprayed.

The spray which falls from the spray devices 41 and 42 and from the fruit and the portion of the conveyor passing over tank 29 falls into this tank to be used over and over again. In order to keep the treating solution as clean as possible, means are provided for screening out the dirt and other solid residue removed by the treating solution from the fruit comprising, in the example illustrated, a plurality of screens 47 arranged in the form of sliding sections or drawers supported by the side walls 34 and 35 of tank 29 just above the normal level of the treating solution therein. These screens may be removed when necessary to dump the accumulation of dirt deposited therein.

Notwithstanding the above mentioned arrangement of screening the treating solution, a certain amount of solid matter finds its way into the spray pipes and tends to clog the spray openings or slots 46. Means have therefore been provided for cleaning out these spray pipes. On the "dead" end of each of the spray pipes 41 and 42, that is, the end away from the liquid supply end, is connected, a T-fitting 48 and to this fitting is connected a pipe 49 controlled by valve 50, pipe 48 leading into tank 29 just above the screens 47. The T fitting 48 is provided with a removable plug 51 in alinement with the spray pipe. By opening valve 50 any accumulation of dirt in the spray pipe ordinarily can be flushed out on the screens 47 while the apparatus is in operation, but if this is not sufficient to remove the dirt, the plug 51 can be removed and a cleaning rod can then be run through the spray pipe to dislodge the dirt.

In order to increase the effectiveness of the apparatus and to ensure all the surfaces of the fruit being sprayed, means are provided for turning the fruit over several times during its travel through the apparatus. In the example illustrated, this means comprises a plurality of toothed rollers or spiders 52 rotatably mounted in side walls 34 and 35 immediately under and adjacent the upper horizontal flight 22 of the conveyor so that the teeth or projections of the rollers project up between rods 14 of the conveyor and engage and turn the fruit as it passes or rides over these rollers as they rotate.

After the fruit, supported on conveyor 11, passes over tank 29 and from between the sprays of treating solution from spray pipes 41 and 42 it passes over tank 30 and between upper and lower spray devices 53 and 54. These spray pipes, which are similar to spray pipes 41 and 42, respectively, are supplied with liquid under pressure by pipe 55 connected to the pressure or discharge side of pump 56, the inlet or suction side of which is connected by pipe 57 to the bottom of tank 30. Although any suitable liquid can be used, it is desirable for the liquid in tank 30 to be in the nature of a rinse to remove any treating solution which remains on the fruit after coming out from the treating-solution-spraying section of the apparatus. The liquid in tank 30 is therefore, in a typical instance, plain water containing a small amount of treating solution which is carried over by the fruit. The liquid in tank 30 is used over and over as in tank 29, the solid matter being screened out from the liquid falling from the spray devices 53 and 54 and the fruit and the section of the conveyor above tank 30 by screen 47.

After passing over tank 30 and from between spray devices 53 and 54 the fruit passes under a rinse spray device 58 located over the inclined discharge section 23 of the conveyor 11. Spray device 58 is connected to any suitable source of fresh or hydrant water. The water from spray device 58 falls on the drip pan 59 leading into tank 30, spray device 58 thus constituting a supply of fresh water for tank 30, the overflow from which passes through overflow opening 60 to be disposed of as desired. After leaving the apparatus at 23 the fruit may undergo a further treatment to provide a waxy or other preservative coating thereon after which it is graded, sized and packed in the usual manner.

It will be observed that apparatus has been provided which is very effective in removing spray or other residues from fruit and that the fruit is handled in such a way as to reduce the chances of injury to a minimum. It will be understood that the invention is not limited to the exact arrangements shown and described and that various modifications can be made without departing from the spirit and scope of the broad invention as defined in the claims.

What is claimed is:

1. Apparatus for treating fruit comprising a fruit conveyor, spray means for spraying a portion of said conveyor, additional spray means for spraying a second portion of said conveyor, said spray means each comprising at least one spray pipe provided with a plurality of substantially parallel slots extending at an angle to the axis of said pipe and at an angle to the direction of travel of said conveyor, said slots forming spray outlets for projecting substantially parallel sheets of spray at an angle to the line of travel of said conveyor, a tank adapted to receive spray falling from said first mentioned spray means, a second tank adapted to receive spray falling from said additional spray means, means adapted to supply liquid under pressure from said first mentioned tank only to said first mentioned spray means, and means for supplying liquid under pressure from said second tank to said additional spray means.

2. Apparatus for treating fruit comprising a fruit conveyor, and a spray pipe mounted adjacent said conveyor, said pipe being provided with a plurality of substantially parallel slots extending at an angle to the axis of said pipe and at an angle to the direction of travel of said conveyor, said slots forming spray outlets for projecting substantially parallel sheets of spray at an angle to the line of travel of said conveyor.

3. Apparatus for treating fruit comprising a fruit conveyor, a tank, a plurality of spray devices located above said tank for projecting liquid on fruit carried by said conveyor, said tank adapted to catch spray fluid falling from said spray pipes and the conveyor and fruit carried thereby, means for screening said spray liquid after it falls from said spray devices and before it falls into said tank, and means for supplying liquid under pressure from said tank to said spray pipes, one end of each of said spray pipes being connected to such supply means, the other end of said spray pipes being provided with a valved flush-out outlet, and means for directing liquid from said outlet onto such screening means.

DOUGLAS C. MORRIS.
LEONARD O. COCKRILL.